US012566128B2

(12) United States Patent
Kim et al.

(10) Patent No.: US 12,566,128 B2
(45) Date of Patent: Mar. 3, 2026

(54) MEASUREMENT APPARATUS AND MEASUREMENT METHOD USING THE SAME

(71) Applicant: SAMSUNG ELECTRONICS CO., LTD., Suwon-si (KR)

(72) Inventors: Jaeho Kim, Suwon-si (KR);
Younghoon Sohn, Suwon-si (KR);
Sunhong Jun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

(21) Appl. No.: 18/237,589

(22) Filed: Aug. 24, 2023

(65) Prior Publication Data

US 2024/0295490 A1     Sep. 5, 2024

(30) Foreign Application Priority Data

Mar. 3, 2023     (KR) ........................ 10-2023-0028697

(51) Int. Cl.
*G01N 21/25* (2006.01)
*G01N 21/956* (2006.01)

(52) U.S. Cl.
CPC ......... *G01N 21/255* (2013.01); *G01N 21/956* (2013.01); *G01N 2201/06113* (2013.01); *G01N 2201/0683* (2013.01)

(58) Field of Classification Search
CPC ............... G01N 21/255; G01N 21/956; G01N 2201/06113; G01N 2201/0683; G01N 21/8806; G01N 2021/8816; G01N 2021/8845; G01N 2021/8848
See application file for complete search history.

(56) References Cited

U.S. PATENT DOCUMENTS

| | | | |
|---|---|---|---|
| 4,158,505 A | 6/1979 | Mathisen et al. | |
| 4,729,647 A | 3/1988 | Goldmunz et al. | |
| 5,882,102 A | 3/1999 | Pileski | |
| 7,274,455 B2 | 9/2007 | Ok et al. | |
| 7,978,324 B2 | 7/2011 | Pan et al. | |
| 8,398,263 B2 | 3/2013 | Tafas et al. | |
| 10,883,824 B2* | 1/2021 | Hur ...................... | G01B 11/254 |
| 2013/0170024 A1* | 7/2013 | Teplitz ................. | G02B 21/084 |
| | | | 359/387 |
| 2015/0133751 A1* | 5/2015 | Stewart ................ | A61B 5/1459 |
| | | | 356/302 |
| 2017/0343476 A1* | 11/2017 | Boege .................... | G02B 21/10 |
| 2018/0025949 A1* | 1/2018 | Sohn ....................... | H01L 24/20 |
| | | | 356/400 |
| 2018/0292706 A1* | 10/2018 | Themelis .................. | G01J 3/36 |

(Continued)

FOREIGN PATENT DOCUMENTS

| | | |
|---|---|---|
| JP | 2021-085863 A | 6/2021 |
| KR | 10-1055693 B1 | 8/2011 |

*Primary Examiner* — Hina F Ayub
*Assistant Examiner* — Kemaya Nguyen
(74) *Attorney, Agent, or Firm* — Sughrue Mion, PLLC

(57) ABSTRACT

A measurement apparatus includes a light source assembly configured to emit light to a sample, a measuring device configured to measure reflected light, and a stage on which the sample is provided, where the light source assembly includes a first plate, a plurality of light sources connected to the first plate and a blocking panel comprising a hole, and one of the plurality of light sources is aligned with the hole in a first direction.

16 Claims, 11 Drawing Sheets

(56)           References Cited

U.S. PATENT DOCUMENTS

2020/0080943 A1 *   3/2020   Zheng ...................... G02B 5/22
2020/0257100 A1 *   8/2020   Putman ................ G02B 21/365
2020/0292414 A1 *   9/2020   Kimura ............. G01M 11/0257
2022/0137392 A1 *   5/2022   Kim ................... G01N 21/6452
                                                             422/82.08

* cited by examiner

MEASUREMENT APPARATUS AND MEASUREMENT METHOD USING THE SAME

CROSS-REFERENCE TO RELATED APPLICATION

This application is based on and claims priority under 35 U.S.C. § 119 to Korean Patent Application No. 10-2023-0028697, filed on Mar. 3, 2023, in the Korean Intellectual Property Office, the disclosure of which is incorporated herein by reference in its entirety.

BACKGROUND

1. Field

Example embodiments of the disclosure relate to a measurement apparatus and a measurement method using the same, and in particular, to a measurement apparatus including a light source assembly having a plurality of light sources and a measurement method using the same.

2. Description of Related Art

Semiconductor devices have been widely used due to their small size, multi-functionality, and/or low fabrication cost. As the semiconductor devices become increasingly integrated with the advancement of the electronic industry, line widths of patterns of the semiconductor devices are being reduced for high integration thereof. Thus, various researches have recently been conducted on techniques for measuring the patterns of the semiconductor device.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

One or more example embodiments provide a measurement apparatus including a light source assembly having a plurality of light sources and a measurement method using the same.

Additional aspects will be set forth in part in the description which follows and, in part, will be apparent from the description, or may be learned by practice of the presented embodiments.

According to an aspect of an example embodiment, a measurement apparatus may include a light source assembly configured to emit light to a sample, a measuring device configured to measure reflected light, and a stage on which the sample is provided, where the light source assembly may include a first plate, a plurality of light sources connected to the first plate and a blocking panel comprising a hole, and one of the plurality of light sources may be aligned with the hole in a first direction.

According to an aspect of an example embodiment, a measurement apparatus may include a light source assembly including a light source mechanism, a filter assembly, and a blocking panel, a polarizer configured to pass through light emitted from the light source assembly, a stage on which a sample is provided, and a measuring device configured to measure light reflected from the sample, where the blocking panel may include a hole penetrating the blocking panel in a first direction, where the light source mechanism may include a first plate, a plurality of light sources connected to the first plate and a first driving device configured to move the first plate, where the filter assembly may include a second plate, a plurality of filters provided on the second plate and a second driving device configured to move the second plate, and where one of the plurality of light sources, one of the plurality of filters, and the hole may be aligned in the first direction.

According to an aspect of an example embodiment, a measurement method may include preparing a sample, emitting light to the sample, and measuring light reflected from the sample, where the emitting light to the sample may include selecting one of a plurality of light sources and selecting one of a plurality of filters.

BRIEF DESCRIPTION OF DRAWINGS

The above and other aspects, features, and advantages of certain example embodiments of the present disclosure will be more apparent from the following description taken in conjunction with the accompanying drawings, in which.

DETAILED DESCRIPTION

Figure 1:
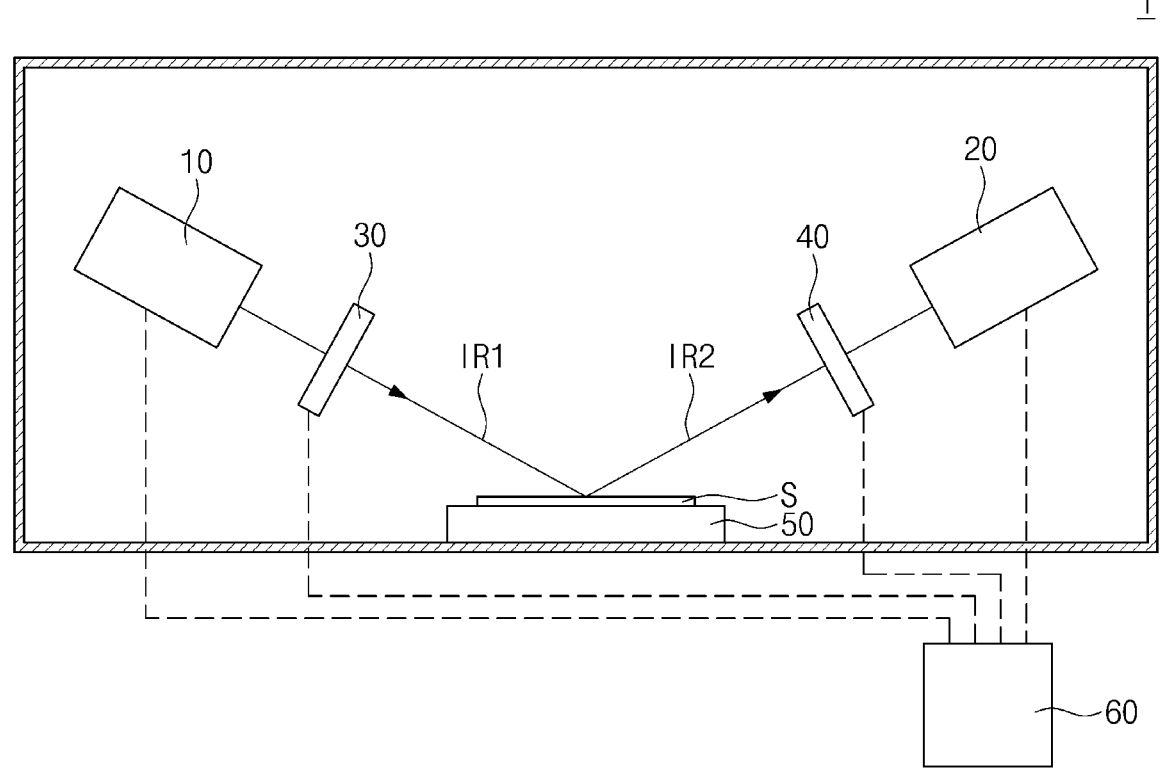
FIG. 1 is a diagram illustrating a measurement apparatus according to one or more embodiments of the present disclosure.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a diagram illustrating a measurement apparatus according to one or more embodiments of the present disclosure.

Referring to FIG. 1, a measurement apparatus 1 may be provided. The measurement apparatus 1 may include a light source assembly 10, a measuring device 20, a first polarizer 30, a second polarizer 40, a stage 50, and a processor 60.

The light source assembly 10 may generate light. The light generated by the light source assembly 10 may be emitted onto a sample S on the stage 50. The light source assembly 10 may include a plurality of light sources. A wavelength of light of each of the plurality of light sources may be different from each other. That is, the light source assembly 10 may generate light having various wavelengths. For example, the light generated by the light source assembly 10 may include mid-infrared rays, but is not limited thereto. That is, the light generated by the light source assembly 10 may include near infrared rays, visible rays, and ultraviolet rays.

The first polarizer 30 may be positioned between the light source assembly 10 and the stage 50. The first polarizer 30 may be disposed in a path of the light emitted from the light source assembly 10. The light emitted from the light source assembly 10 may be perpendicularly incident to the first polarizer 30. The light passing through the first polarizer 30 may be polarized light having a specific vibration direction. The first polarizer 30 may include a polarizing film and optical glass, and optical glass may be attached to both surfaces of the polarizing film.

The stage 50 may be positioned between the first polarizer 30 and the second polarizer 40. The sample S may be disposed on the stage 50, and the stage 50 may fix the sample S. As needed, the stage 50 may move the sample S or adjust a position of the sample S. Incident light IR1 passing through the first polarizer 30 may be reflected on the sample S on the stage 50. A reflected light IR2 reflected by the sample S may move to the measuring device 20. For example, the sample S may be a substrate including a semiconductor pattern, but is not limited thereto.

The second polarizer 40 may be positioned between the stage 50 and the measuring device 20. The second polarizer 40 may be disposed on a path of light reflected by the sample S. That is, the reflected light IR2 may be perpendicularly incident to the second polarizer 40, and the second polarizer 40 may separate the reflected light IR2 into polarized light having vibration directions perpendicular to each other.

The measuring device 20 may be positioned behind the second polarizer 40, and the reflected light IR2 passing through the second polarizer 40 may reach the measuring device 20. The measuring device 20 may receive the reflected light IR2 that has passed through the second polarizer 40. The measuring device 20 may output an electrical signal corresponding thereto depending on characteristics of the reflected light IR2.

The processor 60 may be connected to the light source assembly 10, the measuring device 20, the first polarizer 30, and the second polarizer 40. The processor 60 may select light having a wavelength of a specific region from among lights having various wavelengths provided by the light source assembly 10. The processor 60 may rotate the first polarizer 30 and the second polarizer 40 to obtain polarized light having a specific vibration direction. The processor 60 may receive an electrical output signal from the measuring device 20 and display a result of measuring the sample to a user.

The measurement apparatus 1 may further include a compensator. The compensator may be disposed between the first polarizer 30 and the stage 50 and in the traveling path of the incident light IR1. The compensator may be a device for arbitrarily adjusting a polarization state of light incident on the sample S on the stage 50. That is, the compensator may improve measurement accuracy by adjusting the polarization state of light.

According to an embodiment of the present disclosure, the measurement apparatus 1 may be an apparatus that emits light to the sample S to be measured and measures changes in light intensity, phase, and the like to measure various characteristics such as asymmetry, thickness, refractive index, and surface roughness of the sample S in a non-destructive state. For example, the measurement apparatus 1 may be a spectroscopic ellipsometer. For example, the sample S may include a semiconductor device, and thus the measurement apparatus 1 of the present disclosure may be used to measure characteristics of the semiconductor device.

Figure 2:
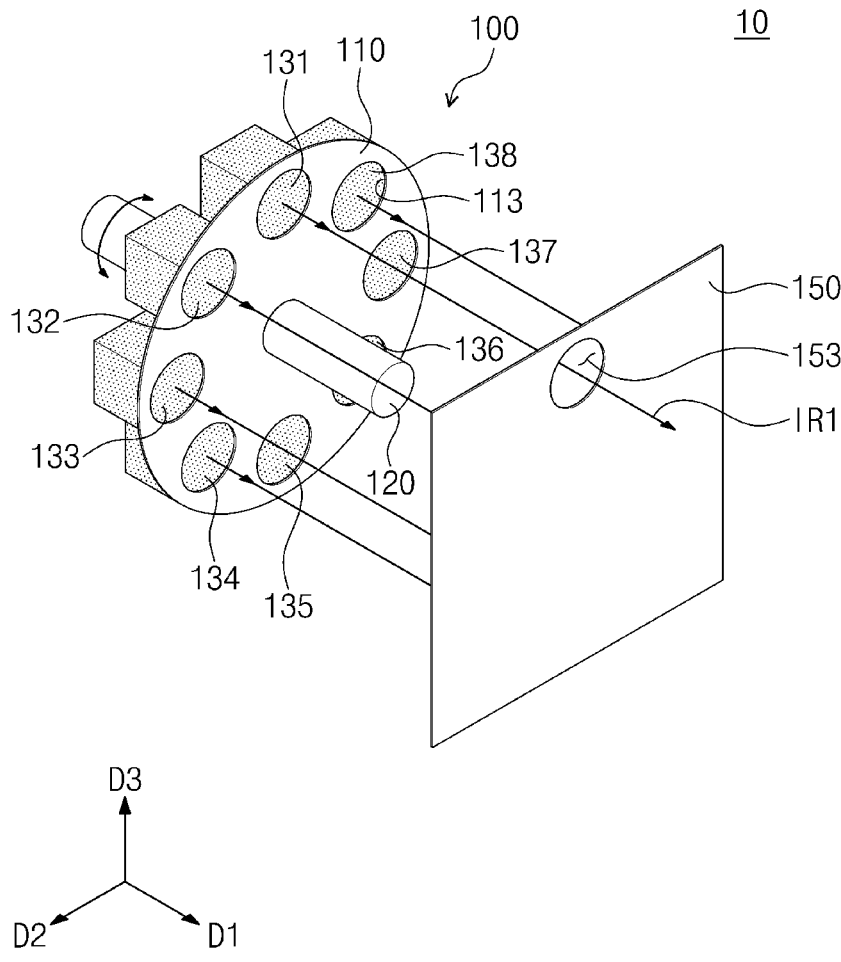
FIG. 2 is a perspective view illustrating a light source assembly according to one or more embodiments of the present disclosure.
Figure 3:
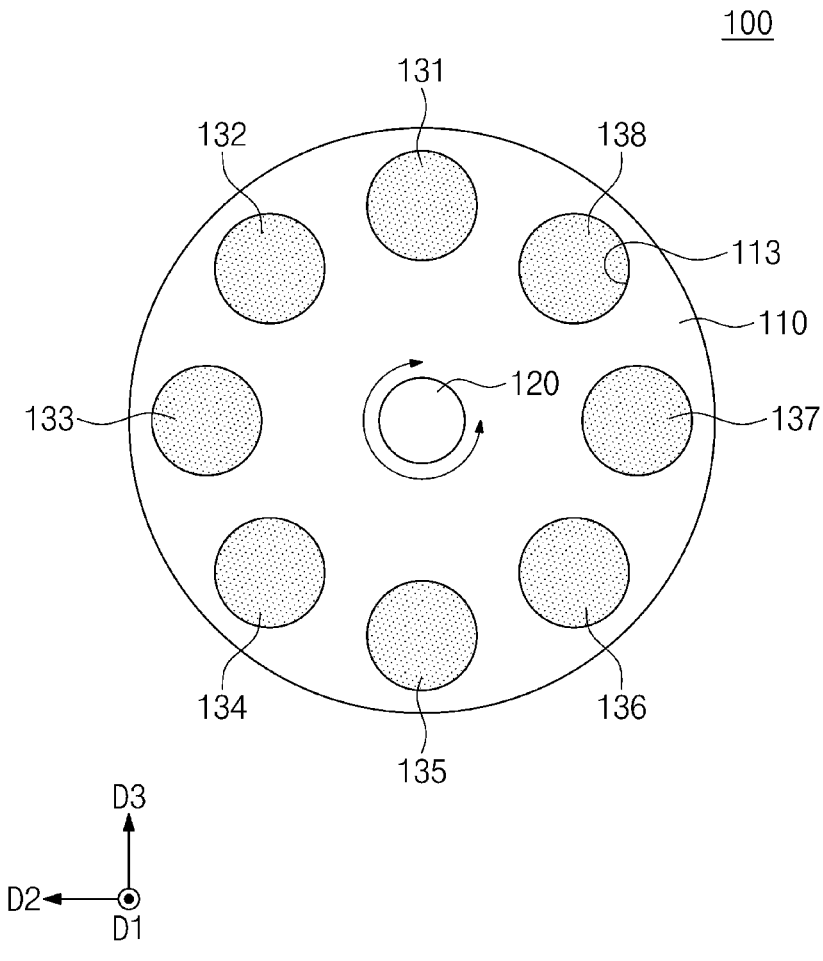
FIG. 3 is a front view illustrating a light source mechanism according to one or more embodiments of the present disclosure.
Figure 4:
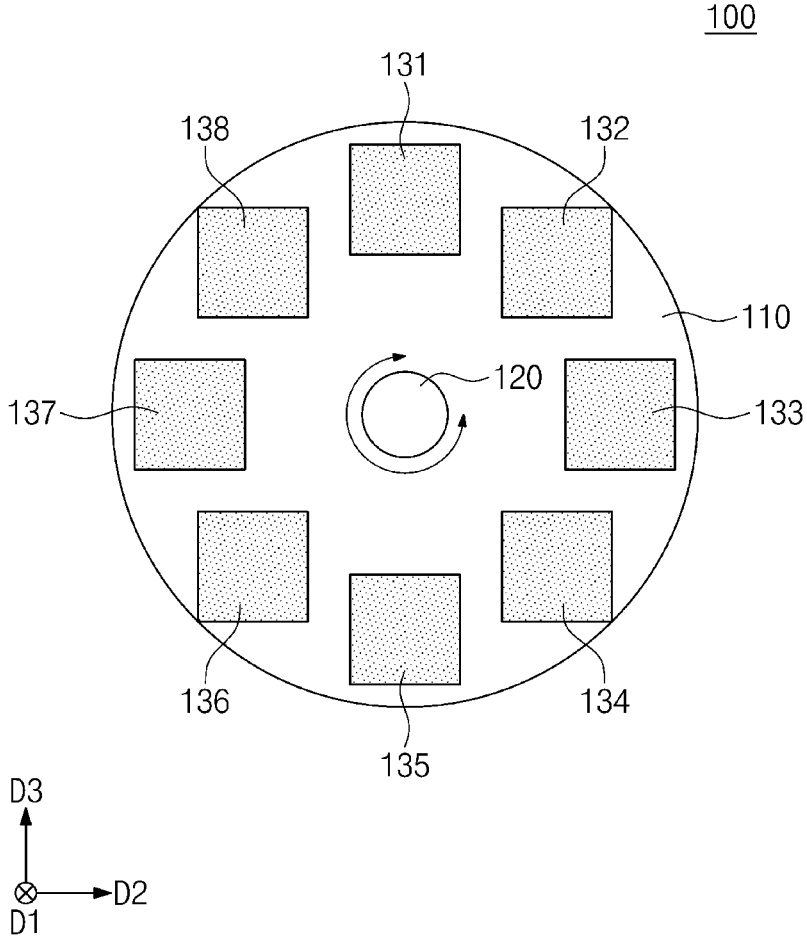
FIG. 4 is a rear view illustrating a light source mechanism according to one or more embodiments of the present disclosure.

FIG. 2 is a perspective view illustrating a light source assembly according to one or more embodiments of the present disclosure. FIG. 3 is a front view illustrating a light source mechanism according to one or more embodiments of the present disclosure. FIG. 4 is a rear view illustrating a light source mechanism according to one or more embodiments of the present disclosure.

Referring to FIGS. 2 to 4, a light source assembly 10 may include a first light source mechanism 100 and a first blocking panel 150. The first light source mechanism 100 and the first blocking panel 150 may be spaced apart from each other in a first direction D1. The first light source mechanism 100 and the first blocking panel 150 may be disposed in a housing providing a certain space.

The first light source mechanism 100 may include a first plate 110, a first driving device 120, and first to eighth light sources 131, 132, 133, 134, 135, 136, 137, and 138. The first plate 110 may be positioned on a plane formed in second and third directions D2 and D3. That is, a front surface of the first plate 110 may be parallel to the second and third directions D2 and D3. For example, the first plate 110 may have a circular shape, but is not limited thereto. The first plate 110 may provide guide holes 113. The guide holes 113 of the first plate 110 may be spaced apart from each other at regular intervals. When the first plate 110 has a circular shape, the guide holes 113 of the first plate 110 may be arranged at regular intervals in a circumferential direction of the first plate 110.

The first driving device 120 may be connected to a center of the first plate 110. The first driving device 120 may have a shape extending in the first direction D1. The first driving device 120 may rotate the first plate 110. The first driving device 120 may rotate the first plate 110 clockwise or counterclockwise on a plane formed in the second and third directions D2 and D3. For example, the first driving device 120 may include a rotary motor.

The first to eighth light sources 131, 132, 133, 134, 135, 136, 137, and 138 may be provided on a rear surface of the first plate 110 and may generate light. Each of the first to eighth light sources 131, 132, 133, 134, 135, 136, 137, and 138 may be located in corresponding guide holes 113 of the first plate 110, respectively. Accordingly, portions of the first to eighth light sources 131, 132, 133, 134, 135, 136, 137, and 138 may be exposed through the guide holes 113 of the first plate 110, respectively. That is, the light generated by the first to eighth light sources 131, 132, 133, 134, 135, 136, 137, and 138 may be emitted through the guide holes 113 of the first plate 110 in the first direction D1. The first to eighth light sources 131, 132, 133, 134, 135, 136, 137, and 138 may be disposed in the guide holes 113 of the first plate 110, and thus the first to eighth light sources 131, 132, 133, 134, 135, 136, 137, and 138 may be spaced apart from each other at regular intervals. When the first plate 110 has a circular shape, the first to eighth light sources 131, 132, 133, 134, 135, 136, 137, and 138 may be arranged in the circumferential direction (e.g., provided circumferentially) of the first plate 110 at regular intervals. However, the present disclosure is not limited thereto. That is, the first to eighth light sources 131, 132, 133, 134, 135, 136, 137, and 138 may be provided on the front side of the first plate 110, and the first plate 110 may not provide a plurality of guide holes 113.

Wavelengths and amounts of light generated from the first to eighth light sources 131, 132, 133, 134, 135, 136, 137, and 138 may be different from each other. The light generated by the first to eighth light sources 131, 132, 133, 134, 135, 136, 137, and 138 may include mid-infrared rays. For example, a wavelength of light generated by the first light source 131 may be about 3.5 μm to about 4.0 μm. A wavelength of light generated by the second light source 132 may be about 4.0 μm to about 4.7 μm. A wavelength of light generated by the third light source 133 may be about 5.0 μm to about 6.0 μm. A wavelength of light generated by the fourth light source 134 may be about 5.5 μm to about 7.5 μm. A wavelength of light generated by the fifth light source 135 may be about 6.8 μm to about 8.6 μm. A wavelength of light generated by the sixth light source 136 may be about 8.5 μm to about 10.7 μm. A wavelength of light generated by the seventh light source 137 may be about 9.5 μm to about 12.5 μm. A wavelength of light generated by the eighth light source 138 may be about 12.5 μm to about 14.0 μm. However, the present disclosure is not limited thereto. That is, the wavelengths of light generated by the first to eighth light sources 131, 132, 133, 134, 135, 136, 137, and 138 may be the same. In addition, light generated by the first to eighth light sources 131, 132, 133, 134, 135, 136, 137, and 138 may include visible light and ultraviolet light.

The first blocking panel 150 may be positioned on a plane formed in the second and third directions D2 and D3. That is, the first blocking panel 150 may be positioned parallel to the first plate 110. On the plane formed in the second and third directions D2 and D3, the first blocking panel 150 may have an area greater than or substantially the same as that of the first plate 110. The first blocking panel 150 may provide a hole 153 penetrating the first blocking panel 150 in the first direction D1. The hole 153 of the first blocking panel 150 may be provided on an upper portion of the first blocking panel 150. A size of the hole 153 of the first blocking panel 150 may be substantially the same as a size of each of the guide holes 113 of the first plate 110, but is not limited thereto.

For example, the first to eighth light sources 131, 132, 133, 134, 135, 136, 137, and 138 may continuously generate light while the light source assembly 10 operates to generate light having uniform characteristics. The first light source 131 may be aligned with the hole 153 of the first blocking panel 150 in the first direction D1, and thus light generated by the first light source 131 may pass through the hole 153 of the first blocking panel 150 and be radiated in the first direction D1. The second to eighth light sources 132, 133, 134, 135, 136, 137, and 138 may not be aligned with the hole 153 of the first blocking panel 150 in the first direction D1 and an area of the first blocking panel 150 may be greater than or substantially equal to an area of the first plate 110. Thus, light generated by the second to eighth light sources 132, 133, 134, 135, 136, 137, and 138 may be blocked by the first blocking panel 150. As a result, light generated by the first light source 131 may be incident light IR1 reaching the sample S of FIG. 1. Alternatively, one of the second to eighth light sources 132, 133, 134, 135, 136, 137, and 138 may be aligned with the hole 153 of the first blocking panel 150 in the first direction D1. In this case, light generated from the light source aligned in the first direction D1 with the hole 153 of the first blocking panel 150 may pass through the hole 153 of the first blocking panel 150, and light generated by the first light source 131 may be blocked by the first blocking panel 150.

That is, as the first plate 110 rotates clockwise or counterclockwise, a light source aligned with the hole 153 of the first blocking panel 150 in the first direction D1 may change. That is, the user may select a light source aligned with the hole 153 of the first blocking panel 150 in the first direction D1 among the plurality of light sources by rotating the first plate 110. The light generated from the selected light source may pass through the hole 153 of the first blocking panel 150, and light generated from unselected light sources may be blocked by the first blocking panel 150. That is, as the first plate 110 is rotated, one of the plurality of light sources may be selected. In addition, wavelengths of light generated by a plurality of light sources may be different from each other. Accordingly, the user may select a light source generating a specific wavelength of light by rotating the first plate 110. Accordingly, the light source assembly 10 of the present disclosure may provide various wavelengths of light, and the user may freely select a specific wavelength of light from among the various wavelengths of light.

The light source assembly 10 may further include a blocking tube. The blocking tube may be positioned between the first light source mechanism 100 and the first blocking panel 150. The blocking tube may be positioned between the first light source 131 of the first light source mechanism 100 and the hole 153 of the first blocking panel 150. An inside of the blocking tube may be an empty space. That is, the blocking tube may have a cylindrical shape extending in the first direction D1. The blocking tube may include a material through which light does not pass (e.g., the blocking tube may be opaque or at least translucent such that some light may pass and some light may not pass). Accordingly, the blocking tube prevents the light generated by the second to eighth light sources 132, 133, 134, 135, 136, 137, and 138 from passing through the hole 153 of the first blocking panel 150. Accordingly, only light generated by the first light source 131 may pass through the hole 153 of the first blocking panel 150. The blocking tube may be connected to the first blocking panel 150 and may be integral with the first blocking panel 150, but is not limited thereto. Even when the first plate 110 of the first light source mechanism 100 rotates, the blocking tube may not move.

Figure 5:
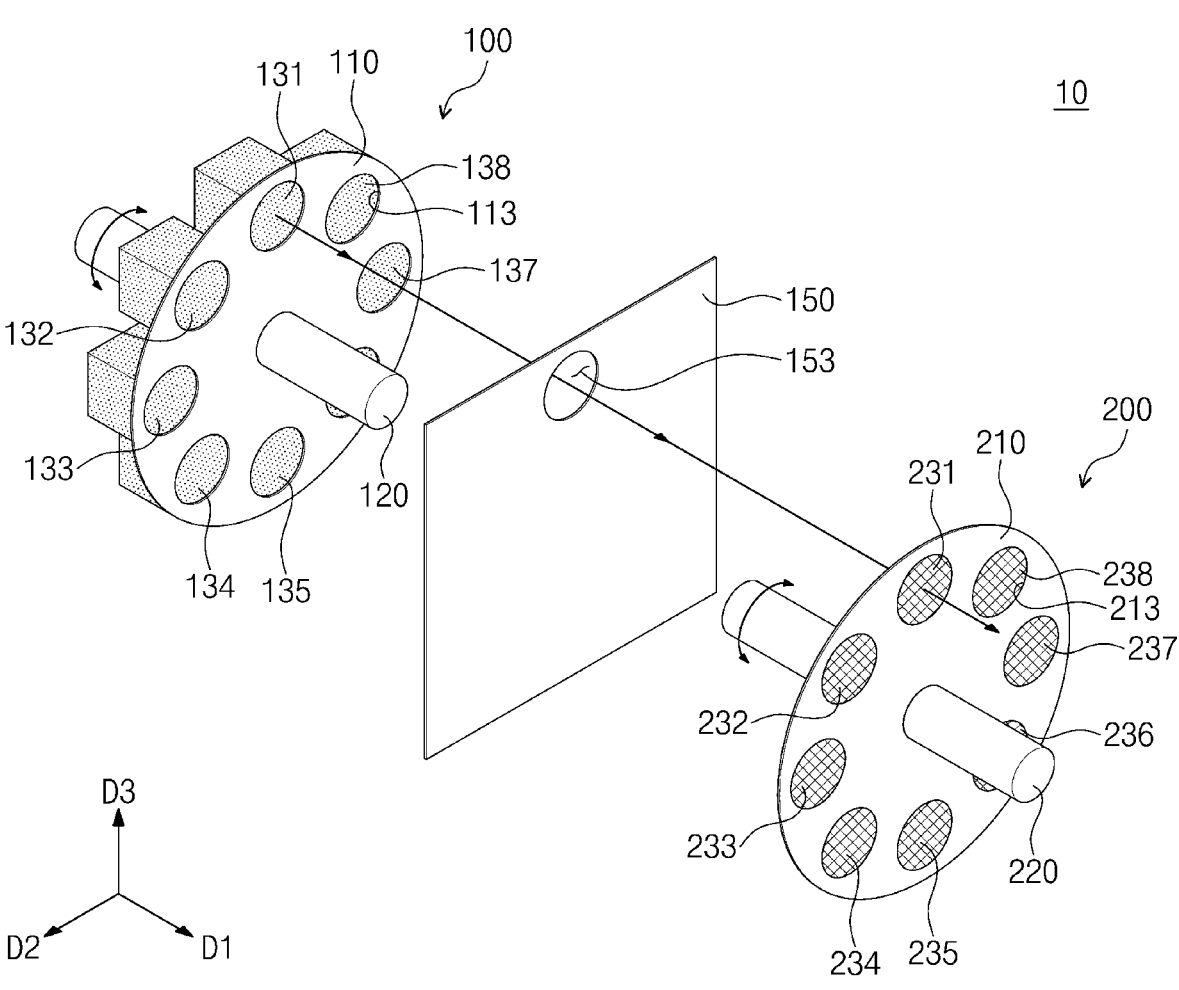
FIGS. 5 and 6 are perspective views illustrating a light source assembly according to one or more embodiments of the present disclosure.
Figure 6:
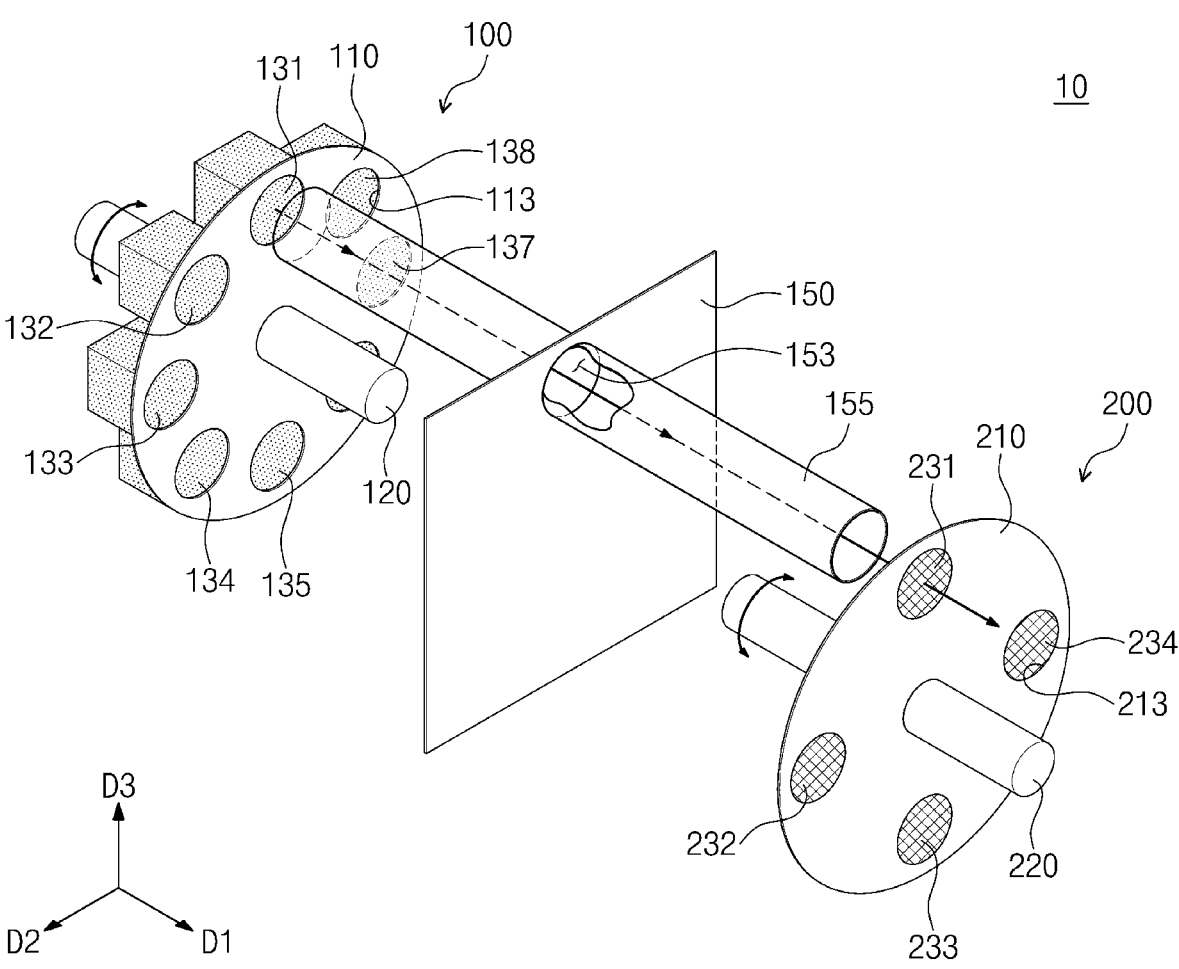

FIGS. 5 and 6 are perspective views illustrating a light source assembly according to one or more embodiments of the present disclosure.

FIGS. 5 and 6 may include aspects that are similar to those described in FIGS. 2 to 4, and repeated descriptions may be omitted.

Referring to FIG. 5, a light source assembly 10 may further include a first filter assembly 200. The first blocking panel 150 may be positioned between the first light source mechanism 100 and the first filter assembly 200. The first light source mechanism 100, the first blocking panel 150, and the first filter assembly 200 may be spaced apart from each other in the first direction D1. The first filter assembly 200 may include a second plate 210, a second driving device 220, and first to eighth filters 231, 232, 233, 234, 235, 236, 237, and 238.

The second plate 210 may be positioned on a plane formed in the second and third directions D2 and D3. That is, a front surface of the second plate 210 may be parallel to the second and third directions D2 and D3. In addition, the second plate 210 may be parallel to the first plate 110 and the first blocking panel 150. For example, the second plate 210 may have a circular shape, but is not limited thereto. The second plate 210 may provide guide holes 213. The guide holes 213 of the second plate 210 may be spaced apart from each other at regular intervals. When the second plate 210 has a circular shape, the guide holes 213 of the second plate 210 may be arranged at regular intervals in a circumferential direction of the second plate 210. A size of the guide holes 213 of the second plate 210 may be substantially the same as a size of the hole 153 of the first blocking panel 150, but is not limited thereto.

The second driving device 220 may be connected to a center of the second plate 210. The second driving device 220 may have a shape extending in the first direction D1. The second driving device 220 may rotate the second plate 210. The second driving device 220 may rotate the second plate 210 clockwise or counterclockwise on a plane formed in the second and third directions D2 and D3. For example, the second driving device 220 may include a rotary motor. That is, the first plate 110 and the first driving device 120 of the first light source mechanism 100 may be substantially the same as the second plate 210 and the second driving device 220 of the first filter assembly 200.

The second driving device 220 may be independent of the first driving device 120. That is, the first driving device 120 and the second driving device 220 may operate individually. For example, the first driving device 120 may rotate the first plate 110 clockwise, and the second driving device 220 may rotate the second plate 210 counterclockwise. Alternatively, rotation angles of the first plate 110 and the second plate 210 may be different from each other, but the present disclosure is not limited thereto. The first and second driving devices 120 and 220 may be one component. In this case, the first and second plates 110 and 210 may rotate simultaneously. That is, the first and second plates 110 and 210 may equally rotate clockwise or counterclockwise, and rotation angles of the first and second plates 110 and 210 may be the same.

The first to eighth filters 231, 232, 233, 234, 235, 236, 237, and 238 may be provided in the guide holes 213 of the second plate 210. That is, each of the first to eighth filters 231, 232, 233, 234, 235, 236, 237, and 238 may be positioned in corresponding guide holes 213 of the second plate 210, respectively, and thus the second plate 210 of the guide holes 213 may be blocked. The first to eighth filters 231, 232, 233, 234, 235, 236, 237, and 238 may be provided in the guide holes 213 of the second plate 210, and thus the first to eighth filters 231, 232, 233, 234, 235, 236, 237, and 238 may be spaced apart from each other at regular intervals. When the second plate 210 has a circular shape, the first to eighth filters 231, 232, 233, 234, 235, 236, 237, and 238 may be arranged in the circumferential direction of the second plate 210 at regular intervals. The first to eighth filters 231, 232, 233, 234, 235, 236, 237, and 238 may reduce the amount of light passing through the first filter assembly 200. That is, the first to eighth filters 231, 232, 233, 234, 235, 236, 237, and 238 may reduce the amount of transmitted light without affecting the wavelength of light. The amount of light reduced by the first to eighth filters 231, 232, 233, 234, 235, 236, 237, and 238 may be different from each other. For example, the first to eighth filters 231, 232, 233, 234, 235, 236, 237, and 238 may include neutral concentration filters, but are not limited thereto. One of the first to eighth filters 231, 232, 233, 234, 235, 236, 237, and 238 may be blocked. That is, one of the first to eighth filters 231, 232, 233, 234, 235, 236, 237, and 238 may include a material through which light does not pass (e.g., one or more of the filters may be opaque or at least translucent such that some light may pass and some light may not pass).

For example, the first filter 231 may be aligned with the hole 153 of the first blocking panel 150 in the first direction D1. The first light source 131 may be aligned with the hole 153 of the first blocking panel 150 in the first direction D1. That is, the first light source 131, the hole 153 of the first blocking panel 150, and the first filter 231 may be aligned in one axis (e.g., in the first direction D1). As a result, light generated by the first light source 131 may pass through the first filter 231. In contrast, one of the second to eighth filters 232, 233, 234, 235, 236, 237, and 238 may be aligned with the hole 153 of the first blocking panel 150 in the first direction D1. In this case, the light generated by the first light source 131 may pass through at least one of the hole 153 of the first blocking panel 150 and the second through eighth filters 232, 233, 234, 235, 236, 237, and 238 arranged in the first direction D1.

That is, the amount of light generated by the first to eighth light sources 131, 132, 133, 134, 135, 136, 137, and 138 may be different from each other, and the amount of light reduced by the first to eighth filters 231, 232, 233, 234, 235, 236, 237, and 238 may be different from each other. Therefore, when the amount of light generated by the light source is large, a filter that greatly reduces the amount of light may correspond thereto. That is, in the light source assembly 10 of the present disclosure, the number of light sources and the number of filters may be the same. The plurality of filters may correspond to each of the plurality of light sources, and thus the light source assembly 10 may provide various wavelengths of light and a uniform amount of light. Accordingly, the measuring device 20 of the measurement apparatus 1 of FIG. 1 may output a noise-free electrical signal.

Referring to FIG. 6, the first filter assembly 200 may include first to fourth filters 231, 232, 233, and 234, and other filters (e.g., fifth to eighth filters 235, 236, 237, and 238 of FIG. 5) may be omitted. For example, some of the first to eighth light sources 131, 132, 133, 134, 135, 136, 137, and 138 may generate similar amounts of light. In this case, as light sources generating similar amounts of light may correspond to one filter, the number of the plurality of filters may be smaller than that of the plurality of light sources.

For example, two light sources of the first light source mechanism 100 may correspond to one filter of the first filter assembly 200. Alternatively, three light sources of the first light source mechanism 100 may correspond to one filter of the first filter assembly 200. However, the present disclosure is not limited thereto, and the plurality of filters of the first filter assembly 200 may be combined in various ways depending on the amount of light from each of the plurality of light sources of the first light source mechanism 100.

Referring to FIGS. 5 and 6, the light source assembly 10 may further include a blocking tube 155. The blocking tube 155 may be positioned between the first light source mechanism 100 and the first filter assembly 200. The blocking tube 155 may be disposed between the first light source 131 of the first light source mechanism 100 and the first filter 231 of the first filter assembly 200, and may pass through the hole 153 of the first blocking panel 150. The blocking tube 155 may include a material through which light does not pass (e.g., the blocking tube 155 may be opaque or at least translucent such that some light may pass and some light may not pass). As a result, light generated by the first light source 131 may pass through the hole 153 of the first blocking panel 150 through the blocking tube 155 and may move to the first filter 231 of the first filter assembly 200. In addition, the blocking tube 155 may prevent light generated by the second to eighth light sources 132, 133, 134, 135, 136, 137, and 138 from passing through the hole 153 of the first blocking panel 150. Accordingly, only light generated by the first light source 131 may pass through the hole 153 of the first blocking panel 150 and reach the first filter 231. The blocking tube 155 may be connected to the first blocking panel 150 and may be integral with the first blocking panel 150, but is not limited thereto. The blocking tube 155 may not move even when the first plate 110 of the first light source mechanism 100 and/or the second plate 210 of the first filter assembly 200 rotate.

Figure 7:
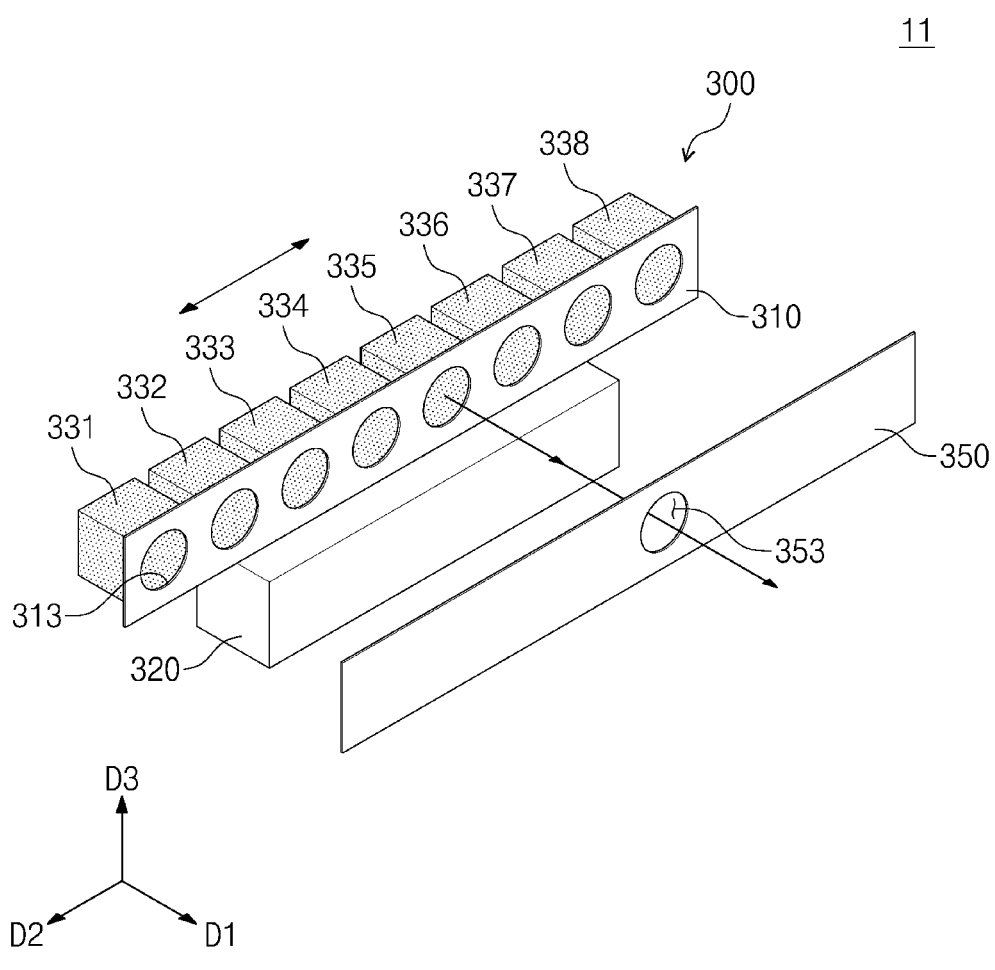
FIG. 7 is a perspective view illustrating a light source assembly according to one or more embodiments of the present disclosure.
Figure 8:
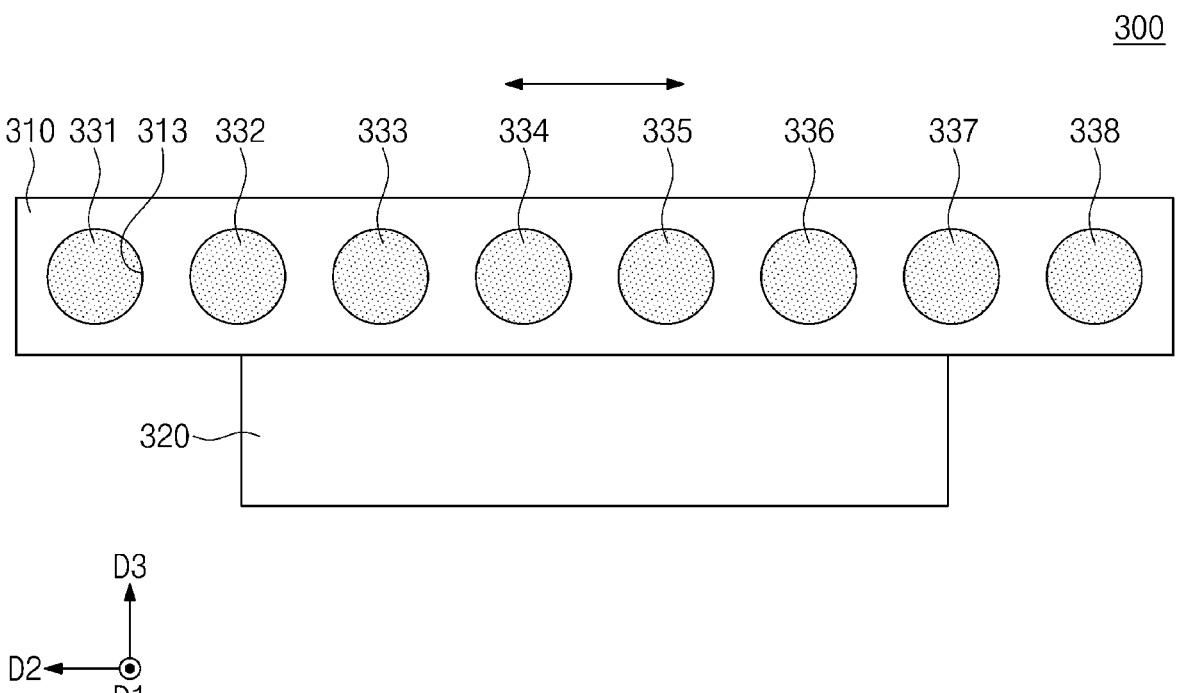
FIG. 8 is a front view illustrating a light source mechanism according to one or more embodiments of the present disclosure.
Figure 9:
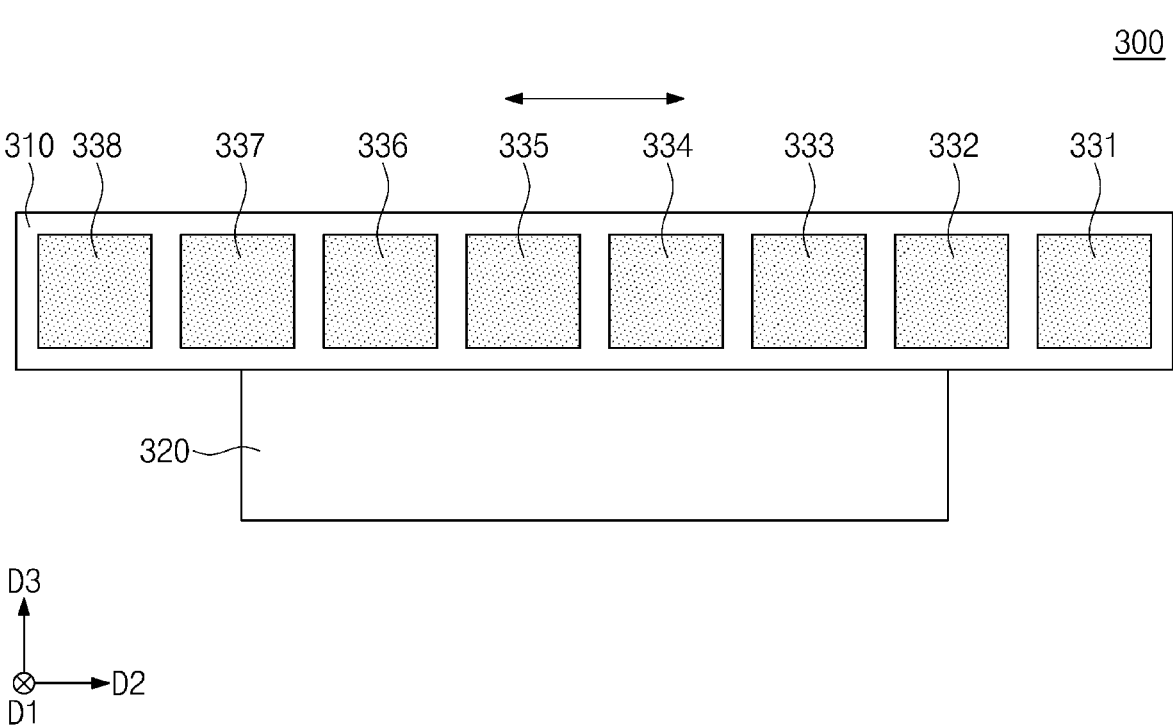
FIG. 9 is a rear view illustrating a light source mechanism according to one or more embodiments of the present disclosure.

FIG. 7 is a perspective view illustrating a light source assembly according to one or more embodiments of the present disclosure. FIG. 8 is a front view illustrating a light source mechanism according to one or more embodiments of the present disclosure. FIG. 9 is a rear view illustrating a light source mechanism according to one or more embodiments of the present disclosure.

Referring to FIGS. 7 to 9, a light source assembly 11 may include a second light source mechanism 300 and a second blocking panel 350. The second light source mechanism 300 and the second blocking panel 350 may be spaced apart from each other in a first direction D1. The second light source mechanism 300 and the second blocking panel 350 may be disposed in a housing providing a certain space.

The second light source mechanism 300 may include a third plate 310, a third driving device 320, and first to eighth light sources 331, 332, 333, 334, 335, 336, 337, and 338. The third plate 310 may be positioned on a plane formed in second and third directions D2 and D3. That is, a front surface of the third plate 310 may be parallel to the second and third directions D2 and D3. For example, the third plate 310 may have a shape extending in the second direction D2, but is not limited thereto. That is, the third plate 310 may have a shape extending in the third direction D3. The third plate 310 may provide guide holes 313. The guide holes 313 of the third plate 310 may be spaced apart from each other at regular intervals. When the third plate 310 has a shape extending in the second direction D2, the guide holes 313 of the third plate 310 may be arranged at regular intervals in the second direction D2.

The third driving device 320 may be connected to a lower portion of the third plate 310. The third driving device 320 may have a shape extending in the second direction D2. The third driving device 320 may move the third plate 310 in the second direction D2. The third driving device 320 may move the third plate 310 in the second direction D2 or in a direction opposite to the second direction D2. For example, the third driving device 320 may include a conveyor belt and a motor.

The first to eighth light sources 331, 332, 333, 334, 335, 336, 337, and 338 may be provided on a rear surface of the third plate 310 and may generate light. Each of the first to eighth light sources 331, 332, 333, 334, 335, 336, 337, and 338 may be disposed in corresponding guide holes 313 of the third plate 310. Accordingly, portions of the first to eighth light sources 331, 332, 333, 334, 335, 336, 337, and 338 may be exposed through the guide holes 313 of the third plate 310. That is, light generated by the first to eighth light sources 331, 332, 333, 334, 335, 336, 337, and 338 may be emitted through the guide holes 313 of the third plate 310 in the first direction D1. The first to eighth light sources 331, 332, 333, 334, 335, 336, 337, and 338 may be disposed in the guide holes 313 of the third plate 310, and thus the first to eighth light sources 331, 332, 333, 334, 335, 336, 337, and 338 may be spaced apart from each other at regular intervals. When the third plate 310 has a shape extending in the second direction D2, the first to eighth light sources 331, 332, 333, 334, 335, 336, 337, and 338 may be arranged in the second direction D2 at regular intervals. However, the present disclosure is not limited thereto. That is, the first to eighth light sources 331, 332, 333, 334, 335, 336, 337, and 338 may be provided on the front side of the third plate 310, and the third plate 310 may not provide a plurality of guide holes 313.

The first to eighth light sources 331, 332, 333, 334, 335, 336, 337, and 338 may be substantially the same as the first to eighth light sources 131, 132, 133, 134, 135, 136, 137, and 138 of the first light source mechanism 100 described with reference to FIGS. 2 to 4. That is, light generated by the first to eighth light sources 331, 332, 333, 334, 335, 336, 337, and 338 may have different wavelengths and amounts of light, and may include mid-infrared light.

The second blocking panel 350 may be positioned on a plane formed in the second and third directions D2 and D3. That is, the second blocking panel 350 may be positioned parallel to the third plate 310. On the plane formed in the second and third directions D2 and D3, the second blocking panel 350 may have an area greater than or substantially the same as that of the third plate 310. The second blocking panel 350 may provide a hole 353 penetrating the second blocking panel 350 in the first direction D1. The hole 353 of the second blocking panel 350 may be provided at a center of the second blocking panel 350. A size of the hole 353 of the second blocking panel 350 may be substantially the same as a size of each of the guide holes 313 of the third plate 310, but is not limited thereto.

For example, when the fifth light source 335 is aligned with the hole 353 of the second blocking panel 350 in the first direction D1, light generated by the fifth light source 335 may pass through the hole 353 of the second blocking panel 350 and be radiated in the first direction D1. The first to fourth light sources 331, 332, 333, and 334 and the sixth to eighth light sources 336, 337, and 338 may not be aligned with the hole 353 of the second blocking panel 350 in the first direction D1, and an area of the second blocking panel 350 may be greater than or substantially equal to an area of the third plate 310. Accordingly, light generated by the first to fourth light sources 331, 332, 333, and 334 and the sixth to eighth light sources 336, 337, and 338 may be blocked by the second blocking panel 350. Unlike this, as the third plate 310 is moved in the second direction D2 by the third driving device 320, a light source aligned with the hole 353 of the second blocking panel 350 in the first direction D1 may be changed. As a result, the light source assembly 11 may obtain substantially the same effect as the light source assembly 10 described in FIGS. 2 to 4. That is, a user may freely select a specific wavelength of light from among various wavelengths of light.

The light source assembly 11 may further include a blocking tube. The blocking tube of the light source assembly 11 may be substantially the same as the blocking tube described in FIGS. 2 to 4. That is, the blocking tube of the light source assembly 11 may be disposed between the fifth light source 335 and the hole 353 of the second blocking panel 350 and may have a cylindrical shape extending in the first direction D1.

Figure 10:
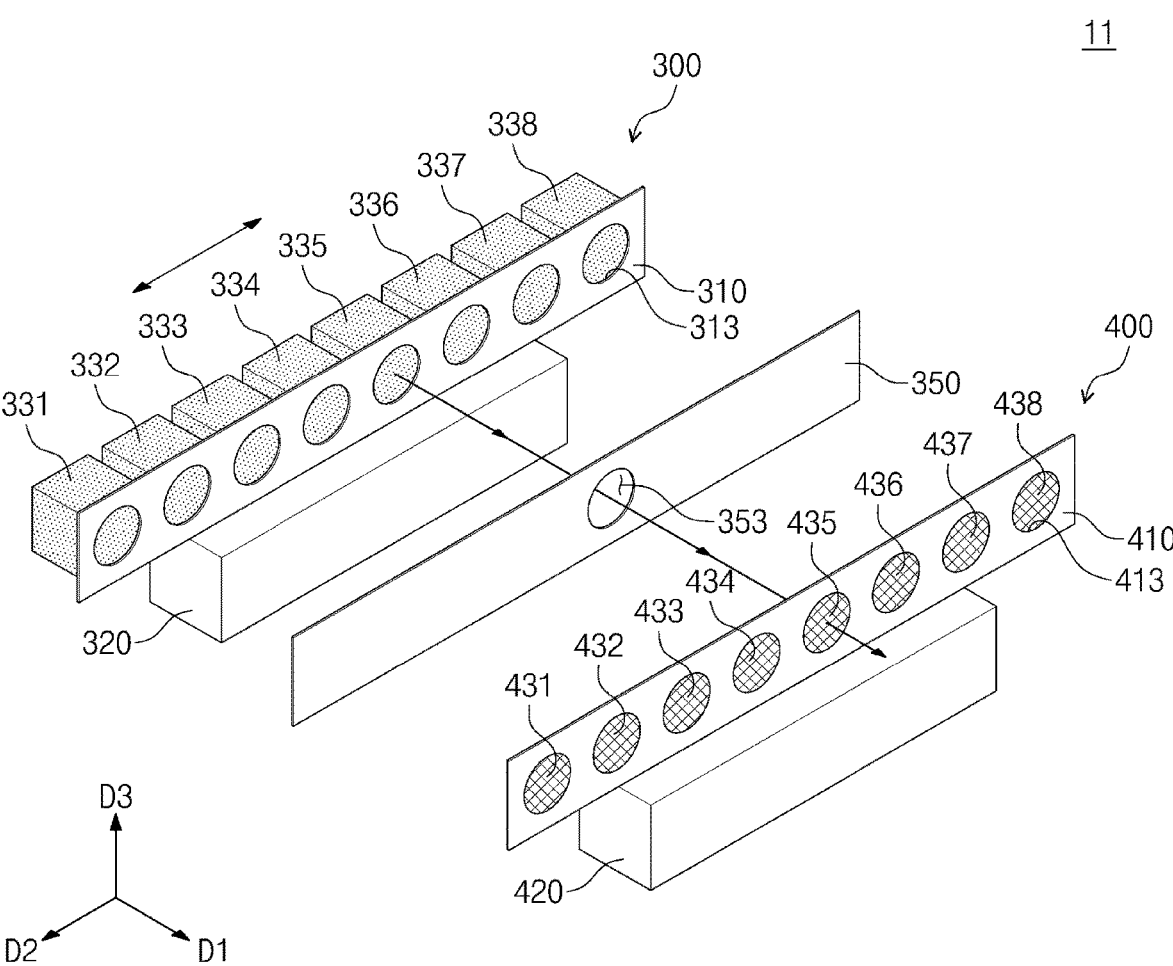
FIGS. 10 and 11 are perspective views illustrating a light source assembly according to one or more embodiments of the present disclosure.
Figure 11:
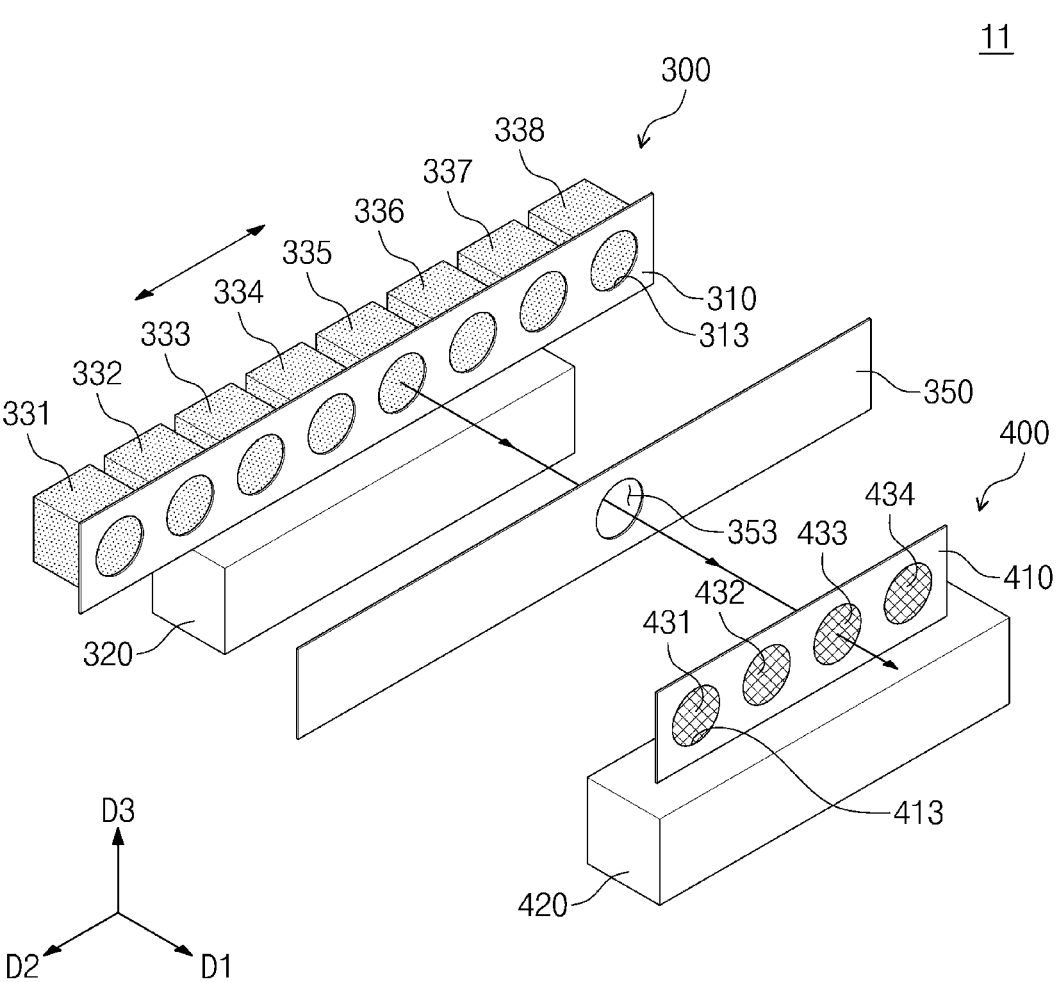

FIGS. 10 and 11 are perspective views illustrating a light source assembly according to one or more embodiments of the present disclosure.

Hereinafter, for convenience of description, descriptions of the same items as those described in FIGS. 7 to 9 will be omitted and differences will be described in detail.

Referring to FIG. 10, the light source assembly 11 may further include a second filter assembly 400. The second blocking panel 350 may be positioned between the second light source mechanism 300 and the second filter assembly 400. The second light source mechanism 300, the second blocking panel 350, and the second filter assembly 400 may be spaced apart from each other in the first direction D1. The second filter assembly 400 may include a fourth plate 410, a fourth driving device 420, and first to eighth filters 431, 432, 433, 434, 435, 436, 437, and 438.

The fourth plate 410 may be positioned on a plane formed in the second and third directions D2 and D3. That is, a front surface of the fourth plate 410 may be parallel to the second and third directions D2 and D3. In addition, the fourth plate 410 may be parallel to the third plate 310 and the second blocking panel 350. For example, the fourth plate 410 may have a shape extending in the second direction D2, but is not limited thereto. The fourth plate 410 may provide guide holes 413. The guide holes 413 of the fourth plate 410 may be spaced apart from each other at regular intervals. When the fourth plate 410 has a shape extending in the second direction D2, the guide holes 413 of the fourth plate 410 may be arranged at regular intervals in the second direction D2. A size of the guide holes 413 of the fourth plate 410 may be substantially the same as a size of the hole 353 of the second blocking panel 350, but is not limited thereto.

The fourth driving device 420 may be connected to a lower portion of the fourth plate 410. The fourth driving device 420 may have a shape extending in the second direction D2. The fourth driving device 420 may move the fourth plate 410 in the second direction D2. The fourth driving device 420 may move the fourth plate 410 in the second direction D2 or in a direction opposite to the second direction D2. For example, the fourth driving device 420 may include a conveyor belt and a motor. That is, the third plate 310 and the third driving device 320 of the second light source mechanism 300 may be substantially the same as the fourth plate 410 and the fourth driving device 420 of the second filter assembly 400.

The fourth driving device 420 may be independent of the third driving device 320. That is, the third driving device 320 and the fourth driving device 420 may operate individually. For example, the third driving device 320 may move the third plate 310 in the second direction D2, and the fourth driving device 420 may move the fourth plate 410 in a direction opposite to the second direction D2. Alternatively, moving distances of the third plate 310 and the fourth plate 410 may be different from each other, but the present disclosure is not limited thereto. The third and fourth driving devices 320 and 420 may be one component. In this case, the third and fourth plates 310 and 410 may rotate simultaneously. That is, the third and fourth plates 310 and 410 may equally move in the second direction D2 or in a direction opposite to the second direction D2, and the moving distances of the third and fourth plates 310 and 410 may be the same as each other.

The first to eighth filters 431, 432, 433, 434, 435, 436, 437, and 438 may be provided in the guide holes 413 of the fourth plate 410. That is, each of the first to eighth filters 431, 432, 433, 434, 435, 436, 437, and 438 may be positioned in the corresponding guide holes 413 of the fourth plate 410, and thus the guide holes 413 of the fourth plate 410 may be blocked. The first to eighth filters 431, 432, 433, 434, 435, 436, 437, and 438 may be provided in the guide holes 413 of the fourth plate 410, and the first to eighth filters 431, 432, 433, 434, 435, 436, 437, and 438 may be spaced apart from each other at regular intervals. When the fourth plate 410 has a shape extending in the second direction D2, the first to eighth filters 431, 432, 433, 434, 435, 436, 437, and 438 may be arranged provided in the second direction D2 at regular intervals. The first to eighth filters 431, 432, 433, 434, 435, 436, 437, and 438 may be substantially the same as the first to eighth filters 231, 232, 233, 234, 235, 236, 237, and 238 as illustrated in FIG. 5.

For example, the fifth filter 435 may be aligned with the hole 353 of the second blocking panel 350 in the first direction D1. The fifth light source 335 may be aligned with the hole 353 of the second blocking panel 350 in the first direction D1. That is, the fifth light source 335, the hole 353 of the second blocking panel 350, and the fifth filter 435 may be aligned in one axis (e.g., in the first direction D1). Accordingly, light generated by the fifth light source 335 may pass through the fifth filter 435. In contrast, as the fourth plate 410 moves in the second direction D2, one of the first to fourth filters 431, 432, 433, and 434 and the sixth to eighth filters 436, 437, and 438 may be aligned with the hole 353 of the second blocking panel 350 in the first direction D1. In this case, the light generated by the fifth light source 335 may pass through one of the first to fourth filters 431, 432, 433, 434 and the sixth to eighth filters 436, 437, and 438 aligned with the hole 353 of the second blocking panel 350 in the first direction D1.

As a result, the light source assembly 11 may obtain substantially the same effect as the light source assembly 10 described in FIG. 5. That is, in the light source assembly 11 of the present disclosure, the number of light sources and the number of filters may be the same. As the plurality of filters correspond to each of the plurality of light sources, the light source assembly 11 may provide various wavelengths of light and a uniform amount of light.

Referring to FIG. 11, a second filter assembly 400 may include first to fourth filters 431, 432, 433, and 434, and fifth to eighth filters 435, 436, 437, and 438 of FIG. 10 may be omitted. For example, some of the first to eighth light sources 331, 332, 333, 334, 335, 336, 337, and 338 may generate similar amounts of light. In this case, the light sources generating similar amounts of light may correspond to one filter, and thus the number of the plurality of filters may be smaller than that of the plurality of light sources. Accordingly, similar to FIG. 6, the plurality of filters of the second filter assembly 400 may be combined in various ways depending on the amount of light from each of the plurality of light sources of the second light source mechanism 300.

Referring to FIGS. 10 and 11, the light source assembly 11 may further include a blocking tube. The blocking tube of the light source assembly 11 may be substantially the same as the blocking tube described in FIGS. 5 and 6. That is, the blocking tube of the light source assembly 11 may be disposed between the fifth light source 335 of the second light source mechanism 300 and the fifth filter 435 of the second filter assembly 400.

Figure 12:
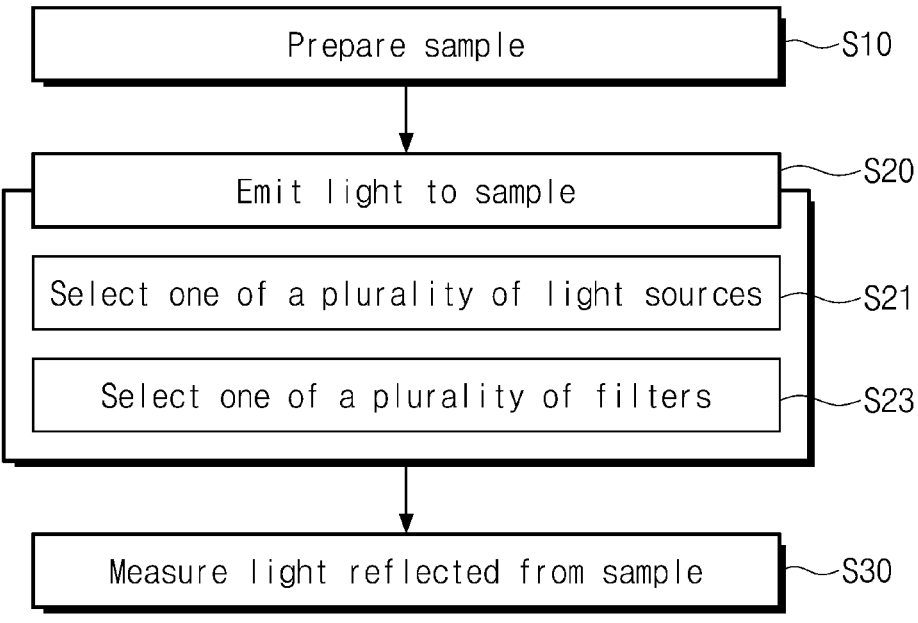
FIG. 12 is a flowchart illustrating a measurement method according to one or more embodiments of the present disclosure.

FIG. 12 is a flowchart illustrating a measurement method according to one or more embodiments of the present disclosure.

Referring to FIG. 12, a measurement method may be provided. The measurement method may refer to a method of measuring a semiconductor pattern included in a sample S using the measurement apparatus 1 of FIG. 1. The measurement method may include preparing a sample in operation S10, emitting light to the sample in operation S20, and measuring light reflected from the sample in operation S30. Emitting light to the sample in operation S20 may include selecting one of a plurality of light sources in operation S21 and selecting one of a plurality of filters in operation S23.

Referring to FIGS. 1 and 12, preparing a sample in operation S10 may include placing the sample S to be inspected on the stage 50 and maintaining the inside of the measurement apparatus 1 in a vacuum state. The sample S may be positioned on the stage 50 by a transfer device or a user. The sample S may be fixed on the stage 50. The sample S may be a substrate including a semiconductor pattern, but is not limited thereto. That is, the sample S may have a shape of a semiconductor chip. Then, the inside of the measurement apparatus 1 may be maintained in a vacuum state.

Referring to FIGS. 5 and 12, selecting one of a plurality of light sources in operation S21 may include rotating the first plate 110 and aligning one of the first to eighth light sources 131, 132, 133, 134, 135, 136, 137, and 138 with the hole 153 of the first blocking panel 150 in the first direction D1. The rotating of the first plate 110 may be performed by the first driving device 120. The first plate 110 may rotate clockwise or counterclockwise. Thereafter, one of the first to eighth light sources 131, 132, 133, 134, 135, 136, 137, and 138 may be aligned with the hole 153 of the first blocking panel 150 in the first direction D1. That is, when the user selects one of the first to eighth light sources 131, 132, 133, 134, 135, 136, 137, and 138 through the processor 60 of FIG. 1, the first driving device 120 may rotate the first plate 110 and one of the first to eighth light sources 131, 132, 133, 134, 135, 136, 137, and 138 may be aligned with the hole 153 of the first blocking panel 150 in the first direction D1. Accordingly, the light generated by the selected light source among the first to eighth light sources 131, 132, 133, 134, 135, 136, 137, and 138 may move to the first filter assembly 200 through the hole 153 of the first blocking panel 150.

Selecting one of the plurality of filters in operation S23 may include rotating the second plate 210 and aligning one of the first to eighth filters 231, 232, 233, 234, 235, 236, 237, and 238 with the hole 153 of the first blocking panel 150 in the first direction D1. The rotating of the second plate 210 may be performed by the second driving device 220. The second plate 210 may rotate clockwise or counterclockwise. Thereafter, one of the first to eighth filters 231, 232, 233, 234, 235, 236, 237, and 238 may be aligned with the hole 153 of the first blocking panel 150 in the first direction D1. Similar to selecting one of the plurality of light sources in operation S21, when the user selects one of the first to eighth filters 231, 232, 233, 234, 235, 236, 237, and 238 through the processor 60 of FIG. 1, the second driving device 220 may rotate the second plate 210 and a selected one of the first to eighth filters 231, 232, 233, 234, 235, 236, 237, and 238 may be aligned with the hole 153 of the first blocking panel 150 in the first direction D1. Accordingly, light passing through the hole 153 of the first blocking panel 150 may pass through the filter selected by the user.

According to an embodiment, emitting the sample with light in operation S20 may be repeatedly performed. The first to eighth light sources 131, 132, 133, 134, 135, 136, 137, and 138 may generate light having different wavelengths, and the first to eighth light sources 131, 132, 133, 134, 135, 136, 137, and 138 may be sequentially selected and emitted to the sample. According to the first to eighth light sources 131, 132, 133, 134, 135, 136, 137, and 138, the first to eighth filters 231, 232, 233, 234, 235, 236, 237, and 238 may be selected sequentially. That is, the sample S of FIG. 1 may be measured using various light wavelengths. The sample S may include a semiconductor pattern, and layers having various thicknesses may constitute the semiconductor pattern. As the wavelength of light increases, transmittance of light through a thick layer of the semiconductor pattern may increase. Accordingly, the sample S including the semiconductor patterns composed of the layers having various thicknesses may be more accurately measured.

According to an embodiment, the first light source 131 and the first filter 231 may be selected and emitted to one sample, and the first light source 131 and selected one of the second to eighth filters 232, 233, 234, 235, 236, 237, and 238 may be emitted to another sample. Alternatively, the first light source 131 and the first filter 231 may be selected and emitted to one sample, selected one of the second to eighth light sources 132, 133, 134, 135, 136, 137, and 138 and the first filter 231 may be emitted to another sample. That is, the first driving device 120 and the second driving device 220 may operate individually, and the plurality of light sources and the plurality of filters may be combined in various ways. Accordingly, the filter corresponding to one light source may vary depending on a sample or a purpose to be measured.

Referring back to FIGS. 1 and 12, measuring the light reflected from the sample in operation S30 may include receiving the reflected light IR2 by the measuring device 20 and transmitting an electrical signal from the measuring device 20 to the processor 60. The reflected light IR2 reflected by the sample S on the stage 50 may pass through the second polarizer 40 and reach the measuring device 20. The measuring device 20 may measure characteristics of the reflected light IR2 and transmit the electrical signal to the processor 60. The processor 60 may show the electrical signal of the measuring device 20 as various data to the user.

The light source assembly of the measurement apparatus according to an embodiment of the present disclosure may include the plurality of light sources. The light generated by each of the plurality of light sources may have the different wavelengths. The sample may be measured using the various wavelengths of the light, and thus the sample may be accurately measured. In addition, the light source assembly may further include the plurality of filters. Each of the plurality of filters may make the amount of light uniform in response to the plurality of light sources. As a result, the noise generated in the electrical signal output from the measuring device may be prevented.

In the measurement method according to an embodiment of the present disclosure, the plurality of light sources and the plurality of filters may be individually operated. That is, selecting one of the plurality of light sources and selecting one of the plurality of filters may be independent. Accordingly, the plurality of light sources and the plurality of filters may be variously combined to emit the sample.

Each of the embodiments provided in the above description is not excluded from being associated with one or more features of another example or another embodiment also provided herein or not provided herein but consistent with the disclosure.

While the disclosure has been particularly shown and described with reference to embodiments thereof, it will be understood that various changes in form and details may be made therein without departing from the spirit and scope of the following claims.

What is claimed is:

1. A measurement apparatus comprising:

a light source assembly configured to emit light to a sample; and a stage on which the sample is provided, wherein the light source assembly comprises:

a first plate;

a plurality of light sources connected to the first plate;

a first driving device configured to rotate the first plate with the plurality of light sources;

a filter assembly; and a blocking panel comprising a hole, wherein the filter assembly comprises:

a second plate;

a plurality of filters provided on the second plate; and a second driving device configured to rotate the second plate with the plurality of filters, wherein the first driving device is configured to rotate the first plate such that one of the plurality of light sources is aligned with the hole of the blocking panel in a first direction, wherein the second driving device is configured to rotate the second plate such that one of the plurality of filters is aligned with the hole of the blocking panel in the first direction, wherein, in response to a selection of a light source, the first driving device is configured to rotate the first plate such that a second one of the plurality of light sources is aligned with the hole in the first direction, and wherein each of the plurality of filters comprises a neutral concentration filter.

2. The measurement apparatus of claim 1, wherein the hole passes through the blocking panel in the first direction, and wherein the first plate and the blocking panel are spaced apart in the first direction.

3. The measurement apparatus of claim 1, wherein each of the plurality of light sources is configured to generate a different wavelength of light.

4. The measurement apparatus of claim 1, wherein the first plate has a circular shape, and wherein the plurality of light sources are provided circumferentially on the first plate.

5. The measurement apparatus of claim 1, further comprising a polarizer configured to polarize the light emitted from the light source assembly.

6. The measurement apparatus of claim 1, wherein the blocking panel is between the filter assembly and the first plate.

7. The measurement apparatus of claim 1, wherein a number of the plurality of filters is equal to a number of the plurality of light sources.

8. The measurement apparatus of claim 1, wherein a number of the plurality of filters is smaller than a number of the plurality of light sources.

9. The measurement apparatus of claim 1, wherein the first driving device and the second driving device are configured to rotate independently of each other.

10. The measurement apparatus of claim 1, wherein the plurality of filters comprise an opaque material.

11. A measurement apparatus comprising:

a light source assembly comprising a light source mechanism, a filter assembly, and a blocking panel;

a polarizer configured to pass through light emitted from the light source assembly; and a stage on which a sample is provided, wherein the blocking panel comprises a hole penetrating the blocking panel in a first direction, wherein the light source mechanism comprises:

a first plate;

a plurality of light sources connected to the first plate; and a first driving device configured to rotate the first plate with the plurality of light sources, wherein the filter assembly comprises:

a second plate;

a plurality of filters provided on the second plate; and a second driving device configured to move the second plate, wherein the first driving device is configured to move the first plate such that one of the plurality of light sources is aligned with the hole of the blocking panel in the first direction, wherein the second driving device is configured to move the second plate such that one of the plurality of filters is aligned with the hole of the blocking panel in the first direction, wherein, in response to a selection of a light source, the first driving device is configured to rotate the first plate such that one of the plurality of light sources is aligned with the hole in the first direction and the second driving device is configured to rotate the second plate such that one of the plurality of filters is aligned with the hole in the first direction, and wherein each of the plurality of filters comprises a neutral concentration filter.

12. The measurement apparatus of claim 11, wherein the first plate comprises a shape that extends in a second direction perpendicular to the first direction, wherein the second plate comprises a shape that extends in the second direction, wherein the plurality of light sources are spaced apart from each other in the second direction, and wherein the plurality of filters are spaced apart from each other in the second direction.

13. The measurement apparatus of claim 12, wherein the first driving device is configured to move the first plate in the second direction, and wherein the second driving device is configured to move the second plate in the second direction.

14. A measurement method comprising:

preparing a sample;

emitting light to the sample; and measuring light reflected from the sample, wherein the emitting light to the sample comprises:

selecting one of a plurality of light sources; and selecting one of a plurality of filters, wherein a blocking panel is provided between the plurality of light sources and the plurality of filters, wherein the blocking panel comprises a hole penetrating the blocking panel in a first direction, wherein the selecting one of the plurality of light sources comprises aligning the selected light source of the plurality of light sources with the hole of the blocking panel in the first direction, wherein the selecting one of the plurality of filters comprises aligning the selected filter of the plurality of filters with the hole of the blocking panel in the first direction, and wherein each of the plurality of filters comprises a neutral concentration filter.

15. The measurement method of claim 14, wherein each of the plurality of light sources is configured to generate a different wavelength of light, and wherein the emitting the light to the sample comprises emitting light of different wavelengths from the plurality of light sources to the sample.

16. The measurement method of claim 14, wherein the sample comprises a semiconductor pattern.

\* \* \* \* \*